(12) United States Patent
Jung (10) Patent No.: US 7,697,496 B2
(45) Date of Patent: Apr. 13, 2010

(54) SYSTEM AND METHOD FOR MULTI-ACCESSING RADIO COMMUNICATION DATA CALL

(75) Inventor: Kwang-Il Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 1058 days.

(21) Appl. No.: 10/614,330

(22) Filed: Jul. 8, 2003

(65) Prior Publication Data

US 2004/0090946 A1  May 13, 2004

(30) Foreign Application Priority Data

Nov. 7, 2002  (KR)  ........... 10-2002-0068901

(51) Int. Cl.
*H04L 12/66* (2006.01)

(52) U.S. Cl. ............... 370/339; 370/338; 370/352; 455/445

(58) Field of Classification Search ......... 370/480, 370/496, 395.5, 395.54, 477, 278, 328, 329, 370/351, 458, 352, 353, 338–339; 455/41.2, 455/41.3, 445, 455
See application file for complete search history.

(56) References Cited

U.S. PATENT DOCUMENTS

| | | | |
|---|---|---|---|
| 6,452,915 B1 | 9/2002 | Jorgensen | 370/338 |
| 6,560,214 B1 * | 5/2003 | Kikinis | 370/338 |
| 6,804,244 B1 * | 10/2004 | Anandakumar et al. | 370/395.21 |
| 6,934,545 B2 * | 8/2005 | Sugimoto | 455/436 |
| 7,068,624 B1 * | 6/2006 | Dantu et al. | 370/331 |
| 7,103,353 B2 * | 9/2006 | Suzuki | 455/414.2 |
| 7,123,910 B2 * | 10/2006 | Lucidarme et al. | 455/434 |
| 7,139,285 B2 * | 11/2006 | Agrawal et al. | 370/458 |
| 7,151,928 B2 * | 12/2006 | Vance | 455/424 |
| 7,325,048 B1 * | 1/2008 | Milito et al. | 709/220 |
| 2001/0029544 A1 * | 10/2001 | Cousins | 709/233 |
| 2002/0075803 A1 * | 6/2002 | Zaharychuk et al. | 370/231 |
| 2002/0126685 A1 * | 9/2002 | Leatherbury et al. | 370/432 |
| 2002/0172191 A1 * | 11/2002 | Harrison | 370/352 |
| 2003/0002518 A1 * | 1/2003 | Shibutani | 370/442 |
| 2003/0142691 A1 * | 7/2003 | Hartmann | 370/442 |

FOREIGN PATENT DOCUMENTS

| | | |
|---|---|---|
| EP | 1111938 A2 | 6/2001 |
| JP | 09-200211 | 7/1997 |
| JP | 11-252656 | 9/1999 |
| JP | 2000-354277 | 12/2000 |
| JP | 2001-016253 | 1/2001 |
| JP | 2001-036586 | 2/2001 |
| KR | 2002-0058405 | 7/2002 |

* cited by examiner

*Primary Examiner*—George Eng
*Assistant Examiner*—Brandon J Miller
(74) *Attorney, Agent, or Firm*—KED & Associates, LLP (57) ABSTRACT

A system for multi-accessing a radio communication data call include a plurality of user equipments controlling allocation of a radio resource according to a desired data transfer rate and a multi-access system for multi-accessing the plurality of user equipments to one or more radio communication terminals according to the allocation control. Because a plurality of user equipments multi-access the data call of the radio communication terminals, a high-speed wireless line can be effectively used. In addition, connecting the plurality of user equipments to one radio communication terminal can be provided with a suitably distributed service from a data service providing network.

9 Claims, 7 Drawing Sheets

SYSTEM AND METHOD FOR MULTI-ACCESSING RADIO COMMUNICATION DATA CALL

BACKGROUND OF THE INVENTION

1. Field of the Invention

The present invention relates to a radio communication system, and more particularly to a system and method for multi-accessing a data call of a radio communication terminal.

2. Background of the Related Art

As electronic technology evolves, radio communication systems including mobile communication systems become more affordable compared to wired communication systems, easier to install compared to cable lines, and more flexible in terms of construction compared with communication networks. Also, radio communication systems are extending service coverage from voice service to data service, and in this regard particular interest is being paid to high-speed radio transmission techniques intended to provide diverse multimedia service.

Figure 1:
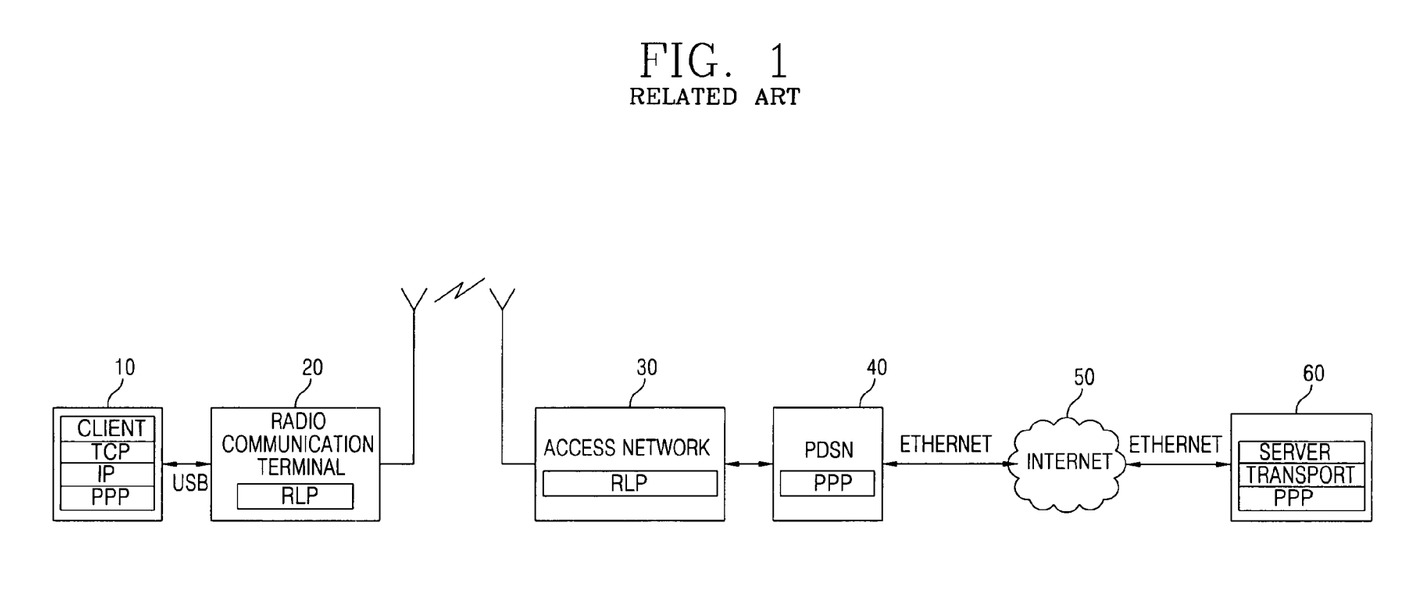
FIG. 1 shows a radio communication system for providing data service of a radio communication terminal in accordance with a conventional art.

FIG. 1 illustrates one example of a radio communication system which provides data service to a radio communication terminal in accordance with a related art. This system consists of user equipment 10, a radio communication terminal (or an access terminal) 20, an access network 30, a packet data serving node 40, the internet 50, and a host 60. The user equipment is connected, one-on-one by wire, to the radio communication terminal and requests data service. The access network (AN) provides an air interface with the radio communication terminal and further provides a core network interface. The host provides the packet data communication service through the Internet, and the packet data serving node (PDSN) connects the host and the access network.

The user equipment 10 includes a personal computer (PC), a packet call equipment or the like, and is connected to the radio communication terminal 20 through a universal serial bus (USB). A protocol stack of the user equipment includes a point-to-point protocol (PPP), a protocol between two ends, an Internet protocol (IP), a transmission control protocol (TCP), and a client application layer.

The radio communication terminal 20 and the access network 30 include a radio link protocol (RLP), respectively, in order to ensure a reliability of a radio link.

The PDSN 40 includes the PPP, and the host 60 includes an IP, a transport layer and a server application layer.

Data service operation of the radio communication terminal in the conventional radio communication system will now be explained. Initially, the user equipment 10 transmits data to the radio communication terminal 20 through the USB connection, the radio communication terminal 20 transmits the data to the access network 30 through an air interface, and the access network 30 transmits the data to the host 60 through the PDSN 40. Then, the host 60 provides a requested data service to the user equipment 10.

Communication systems as described above have a number of drawbacks. In particular, since the user equipment 10 uses a PPP, one user equipment 10 and one radio communication terminal 20 are connected and the one radio communication terminal 20 is connected to one PPP of the PDSN 40. Because one user equipment 10 is used by being connected to one radio communication terminal 2, the high speed radio resource, for example, a radio resource of 2.4 Mbps, is occupied by one user. This results in waste of a radio bandwidth.

SUMMARY OF THE INVENTION

An object of the invention is to solve at least the above problems and/or disadvantages and to provide at least the advantages described hereinafter.

Another object of the present invention is to provide a system and method for multi-accessing a data call of a radio communication terminal that are capable of effectively using a high speed wireless line.

Another object of the present invention is to provide a data service system and method of a radio communication terminal which suitably distributes and provides a data service from a network to a plurality of user equipments accessed to one radio communication terminal.

Another object of the present invention is to provide a data service system and method of a radio communication terminal which provides a data-call service to user equipments using a lesser number of radio communication terminals in case that the number of user equipments is greater than the number of the radio communication terminals.

Another object of the present invention is to provide a data service system and method of a radio communication terminal which sets and uses a radio resource at a transfer rate as desired by a user.

To achieve at least the above objects in whole or in parts, there is provided a system for multi-accessing a radio communication data call including: a plurality of user equipments controlling allocation of a radio resource according to a desired data transfer rate; and a multi-access system for multi-accessing the plurality of user equipments to one or more radio communication terminals according to the controlling.

To achieve at least these advantages in whole or in parts, there is further provided a method for multi-accessing a radio communication data call including the steps of setting a data call multi-access mode according to a command of a user equipment; mapping transmission data of a plurality of user equipments to a plurality of radio communication terminals according to the set call multi-access mode; storing IP addresses of transmission data and user equipment addresses of transmission data by radio communication terminals; searching user equipment addresses by radio communication terminals by using the IP addresses of the reception data transmitted from the plurality of radio communication terminals; and transmitting the reception data to the searched user equipment addresses.

To achieve at least these advantages in whole or in parts, there is further provided a method for multi-accessing a radio communication data call including the steps of: receiving transmission data from a plurality of user equipments; identifying a type of the transmission data; performing a corresponding command if the transmission data is an MAS data for controlling a multi-access system; allocating a time slot of each radio communication terminal to the transmission data according to a set slot allocation method if the transmission data is a general data for a data service; storing an IP address of the transmission data and the user equipment address in an IP address table by radio communication terminals; receiving reception data from the plurality of radio communication terminals; searching an IP address table of a corresponding radio communication terminal by using an IP address of the reception data; and transmitting the reception data to a user equipment there is a user equipment address of the IP address in the IP address table.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 2:
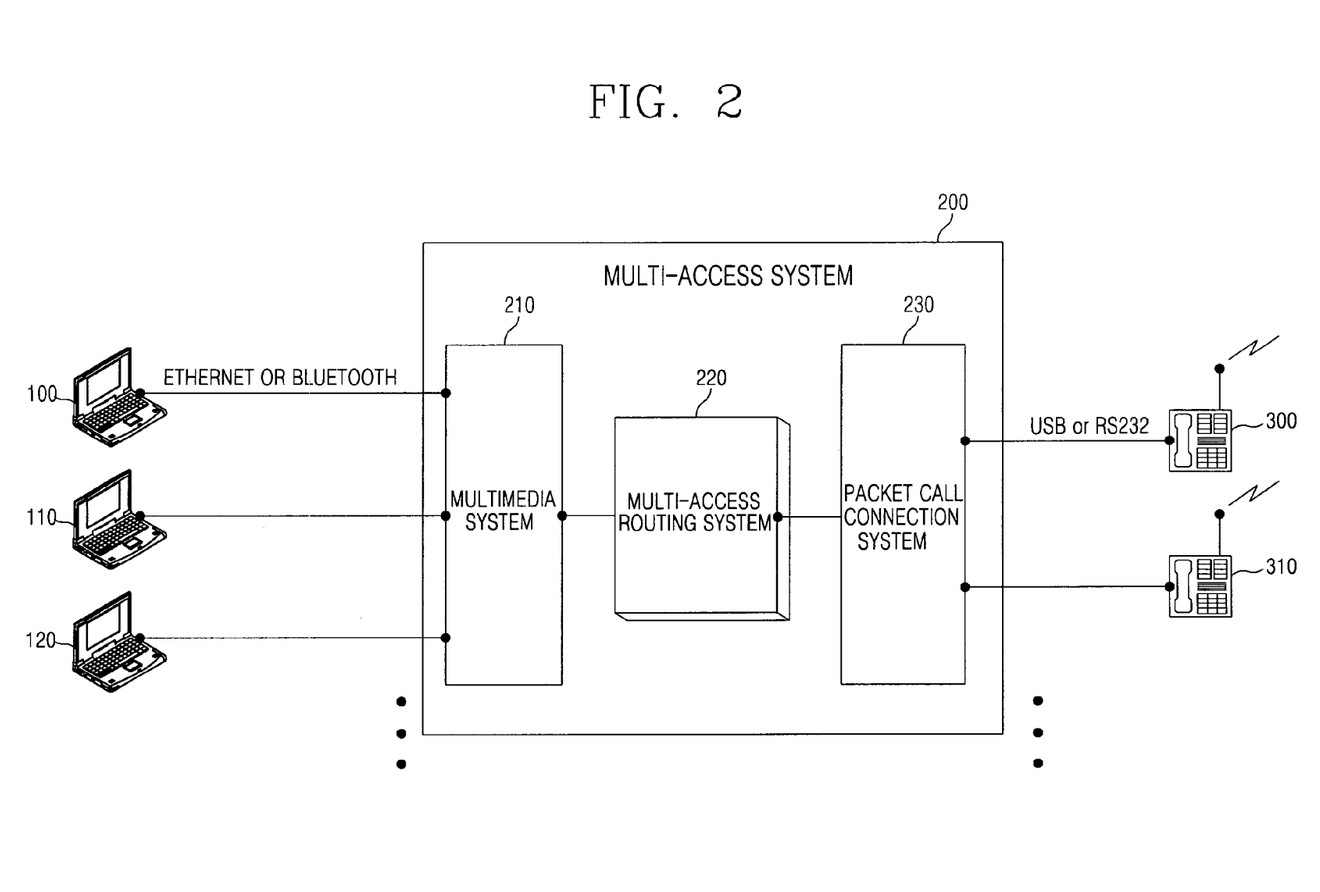
FIG. 2 shows a system for multi-accessing a radio communication data call in accordance with a preferred embodiment of the present invention.

Referring to FIG. 2, a system for multi-accessing a radio communication data call in accordance with a preferred embodiment of the present invention includes user equipment 100-120 controlling setting of a radio resource according to a desired data transfer rate, and a multi-access system (MAS) 200 for allowing the user equipment 100-120 to access one or more radio communication terminals 300-310. The multi-access system includes a multimedia system 210 for interfacing with the user equipment 100-120, for example, by an ethernet or a bluetooth method, a packet call connection system 230 for interfacing with one or more radio communication terminals 300-310, for example, by a USB or an RS232C connection protocol, and a multi-access routing system 220 for routing data of the user equipment 100-120 transmitted from the multimedia system 210 to the radio communication terminals 300-310.

Figure 3:
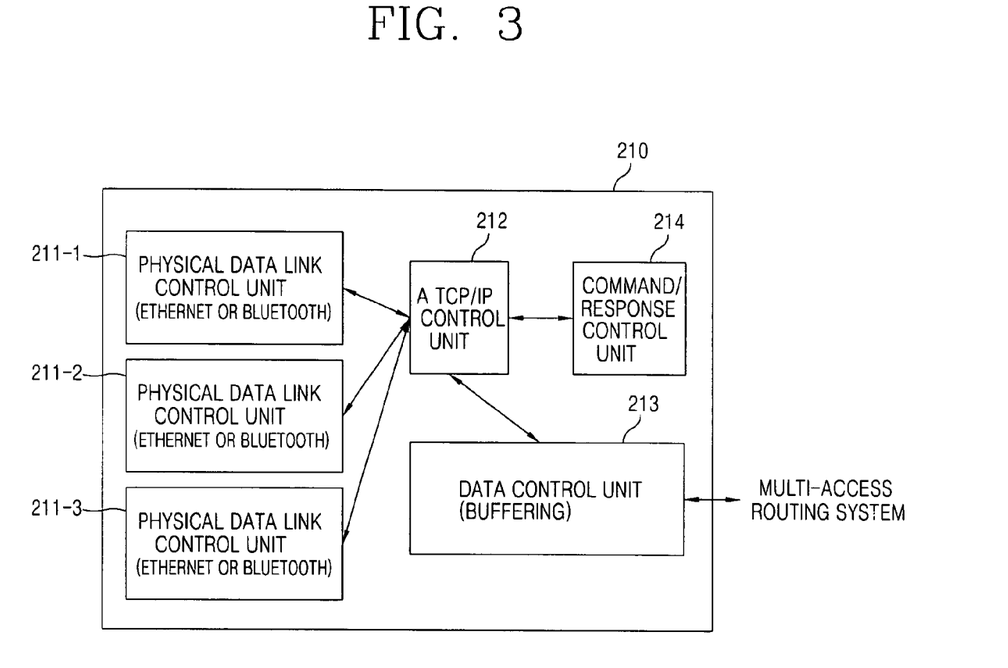
FIG. 3 shows a construction of a multimedia system.

FIG. 3 shows that the multimedia system 210 includes physical data link control units 211-1-211-3, a TCP/IP control unit 212, a data control unit 213, and a command/response control unit 214. The physical data link control units are provided in one-to-one correspondence with the user equipment 100-120 and control a physical data link. The TCP/IP control unit 212 performs a TCP/IP protocol function on data transmitted from the plurality of physical data link control units. The command/response control unit 214 performs/responds to a command of the user equipments 100-120 transmitted from the TCP/IP control unit 212 and responds. And, the data control unit 213 sorts and buffers data transmitted from the TCP/IP control unit.

The multi-access routing system 220 sets a slot assignment method according to a command of the user equipment 100-120, assigns a slot to the user equipment 100-120 according to the set slot assignment method, and routes a transmission/reception data between the user equipment 100-120 and the radio communication terminals 300-310.

Figure 4:
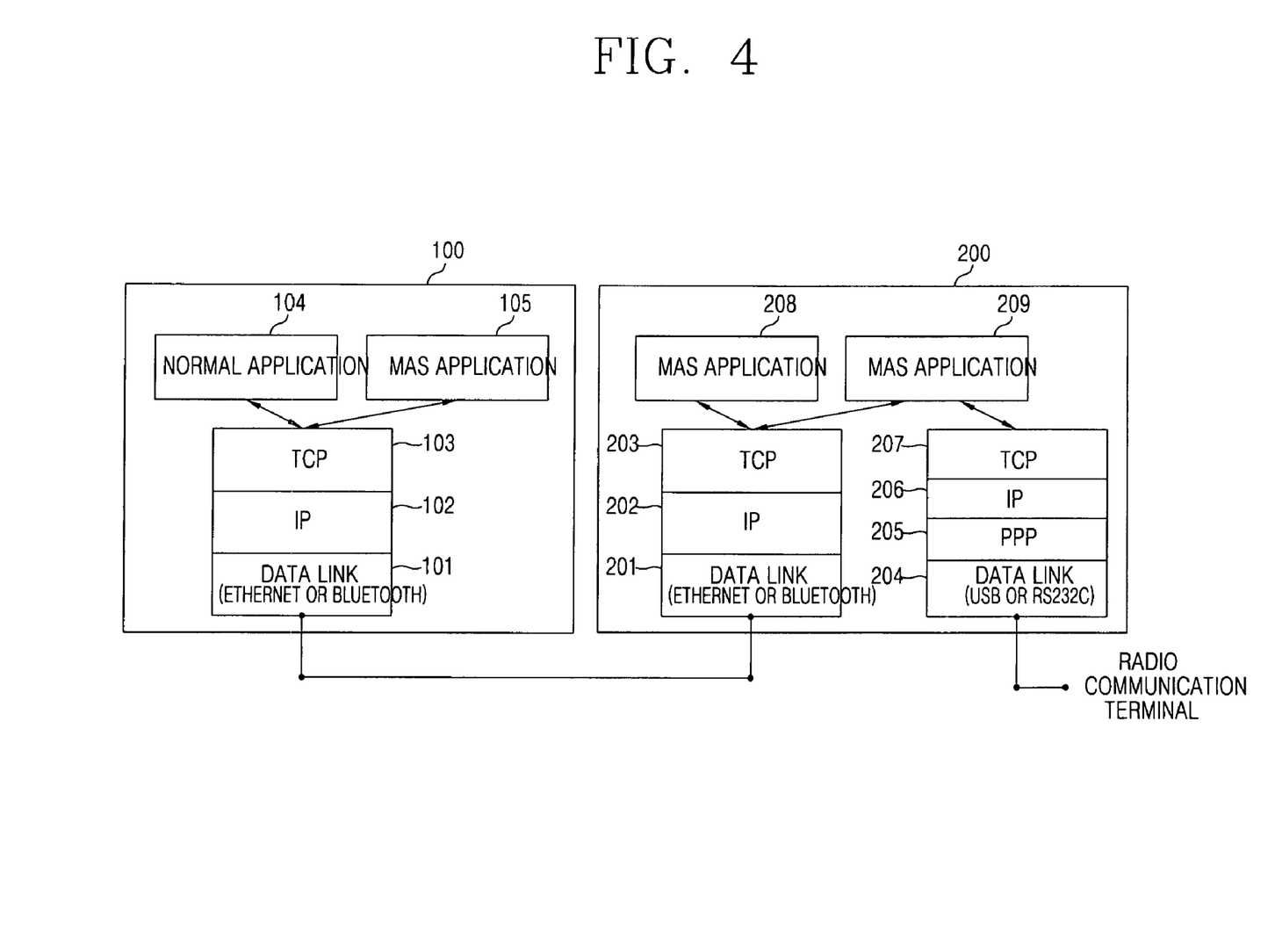
FIG. 4 shows a protocol stack between a user equipment and a multi-access system.

FIG. 4 shows a way in which a protocol stack may be configured between a user equipment and a multi-access system. Here, one of the user equipments, for example, user equipment 100, includes a data link layer 101 for interfacing with the multi-access system (MAS) 200 by an ethernet or a bluetooth method, an IP layer 102, a TCP layer 103, a normal application layer 104 for a data service, and an MAS application layer 105 for controlling the multi-access system 200.

In the multi-access system (MAS) 200, the multimedia system 210 includes a data link layer 201 for interfacing with the user equipment 100 by an ethernet or a bluetooth method, an IP layer 202, and a TCP layer 203. The packet call connection system 230 includes a data link layer 204 for interfacing with the radio communication terminals 300-310 by a USB or an RS232C method, a PPP layer 205, an IP layer 206 and a TCP layer 207. The multi-access system (MAS) further includes an MAS application layer 208 for communicating with the MAS application layer 105 of the user equipment 200 and a multi-access routing layer 209 for storing an IP of a local sub-network and performing a multi-access routing.

Operation of the radio communication data call multi-access system constructed as described above will now be explained. Here, an access network (AN) 30, a PDSN 40, the Internet 50 and a host 60 of FIG. 1 are referred to as necessary.

When the user equipment 100-120 receives a command from a user for a data service, the MAS application layer 105 of the user equipment 100-120 may transmit the command to the MAS application layer 208 of the multi-access system 200 in order to set a slot assignment method of the multi-access system 200.

In the slot-assignment method, a one-on-one assignment method and a common sharing method can be used. The one-on-one assignment method involves routing the user equipment and the radio communication terminal by connecting them one-on-one. Meanwhile, the common sharing method routes data of the user equipment to the radio communication terminal, in which if there is an empty slot, a data of the user equipment is assigned thereto.

The common sharing method is generally used in case that there are more user equipments than the radio communication terminals. According to circumstances, in case that, for example, if a user equipment has a lot of data to be transmitted while other user equipments are not in a communication state, the common sharing method can be adopted to allow the user equipment to exclusively occupy several radio communication terminals.

Figure 6:
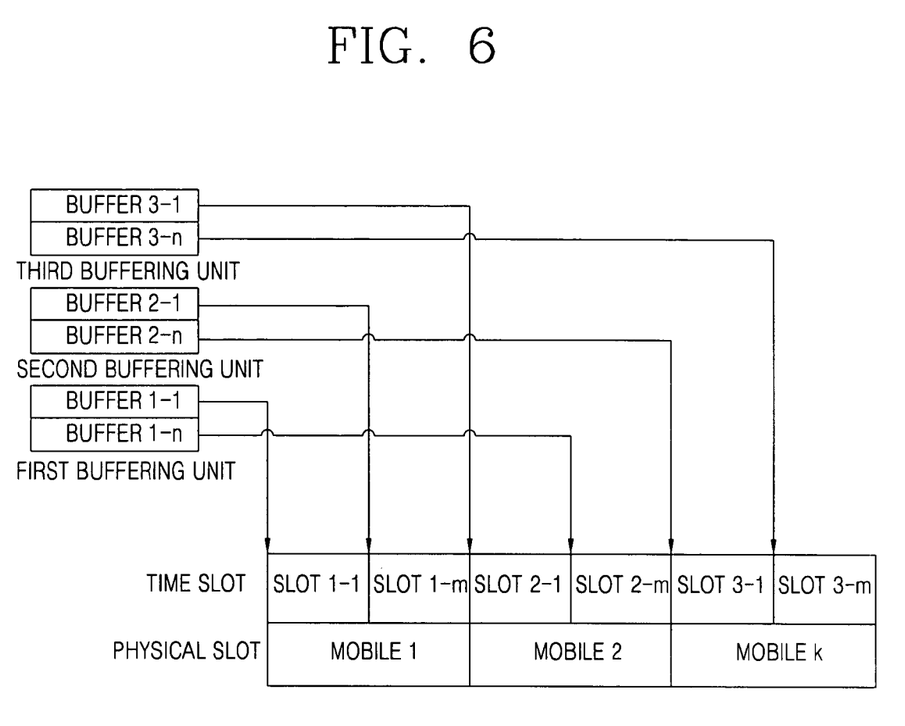
FIG. 6 shows steps included in a method of allocating transmission data of the user equipments to time slots of each radio communication terminal using a common sharing method.

FIG. 6 illustrates a method of allocating transmission data of the user equipments to time slots of each radio communication terminal using a common sharing method. Here, each buffering unit corresponds one-on-one to user equipments. A first buffer buffers a data (packet) received from the user equipment 100. A second buffering unit buffers a packet received from the user equipment 110. A buffer 1-1 of the first buffering unit buffers a first packet received from the user equipment 100, and a buffer 1-$n$ buffers the nth packet received from the user equipment 100. Physical slots (mobile 1, mobile 2 and mobile k) are provided in one-on-one correspondence to each of the radio communication terminals 300, 310 and 320 (not shown in FIG. 2), and each physical slot has '$m$' number of time slots ((slot101)-(slot1-$m$)) ((slot2-1)-(slot2-$m$)) ((slot3-1)-(slot3-$m$)).

At this time, the multi-access routing system 220 fetches packets, in turn, from the first buffering unit to the third buffering unit preferably in a round-robin system and maps the fetched packets to each time slot of the physical slot (mobile 1) in the fetched order. That is, time slots are assigned such that if time slots of one physical slot (mobile 1) is full, the next fetched packet is assigned to the first time slot of the next physical slot (mobile 2).

The time slots of each of the radio communication terminals 300-320 are assigned, the multi-access routing system 220 stores a destination IP address and a source data link address of a packet by the radio communication terminals 300-320.

Accordingly, even though packets are transmitted from the same user equipment 100, they are transmitted in the air through the plurality of radio communication terminals 300, 310 and 320. In this manner, according to the common sharing method, the user equipment 100-120 can transmit packets through all the radio communication terminals 300-320, the user equipment 100-120 can advantageously use one radio connection. The case that the user equipment 100-120 transmits data to the radio communication terminals 300-310 will now be described.

Figure 5:
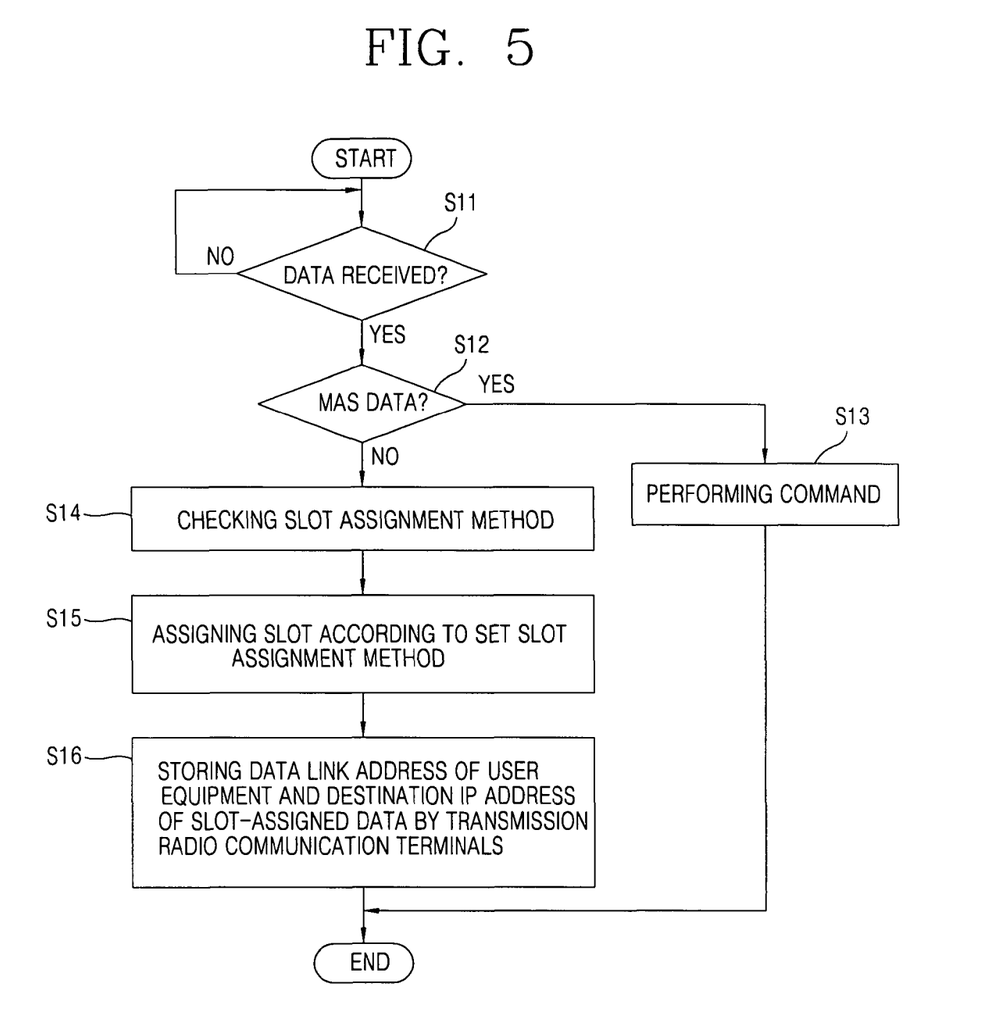
FIG. 5 is a flow chart showing steps included in a method for multi-accessing transmission data of a plurality of user equipments to radio communication terminals by a multi-access system.

FIG. 5 is a flow chart of a method of multi-accessing of transmission data of a plurality of user equipments to radio communication terminals by a multi-access system. When data is transmitted from the user equipment 100-120 to the multi-access system 200 (step S11), the multimedia system 210 of the multi-access system 200 checks whether the data is an MAS command for controlling a state of the multi-access system 200 or a slot assignment method (step S12).

If the received data is the MAS command, the command/response control unit 214 performs the MAS command. If the MAS command is a command for monitoring a state of the multi-access system 200, the command/response control unit 214 displays the state of the multi-access system 200 to the user equipment 100-120. At this time, the multi-access system 200 can perform a state display to one requested user equipment or perform a state display to all the user equipment 100-120.

If the MAS command is a command for controlling the slot assignment method, the command/response control unit 214 sets a slot assignment method according to the MAS command (step S13).

If the received data is a normal data for a data service, the multimedia system 210 sorts and buffers the data by user equipments 100-120 by means of the data control unit 213.

The multi-access system 200 checks the set slot assignment method (step S14) and assigns data of each of the user equipments 100-120 to the time slots of the corresponding radio communication terminal (step S15). At this time, the multi-access routing system 220 of the multi-access system 200 stores a destination IP address of the slot-assigned data and a data link address of the user terminal which has transmitted the data in the IP address table by radio communication terminals (S16). When data is transmitted from the user equipments 100-120 to the radio communication terminals 300-310, it is transmitted on the basis of TCP/IP.

In this manner, the multi-access system can change the slot assignment method according to the command of the data service user and transmit data the plurality of user terminals 100-120 transmits to the access network 30 through the plurality of radio communication terminals 300-310. The case that the radio communication terminals 300-310 routes a data received from the access network 30 to the user equipment 100-120 will now be described.

Figure 7:
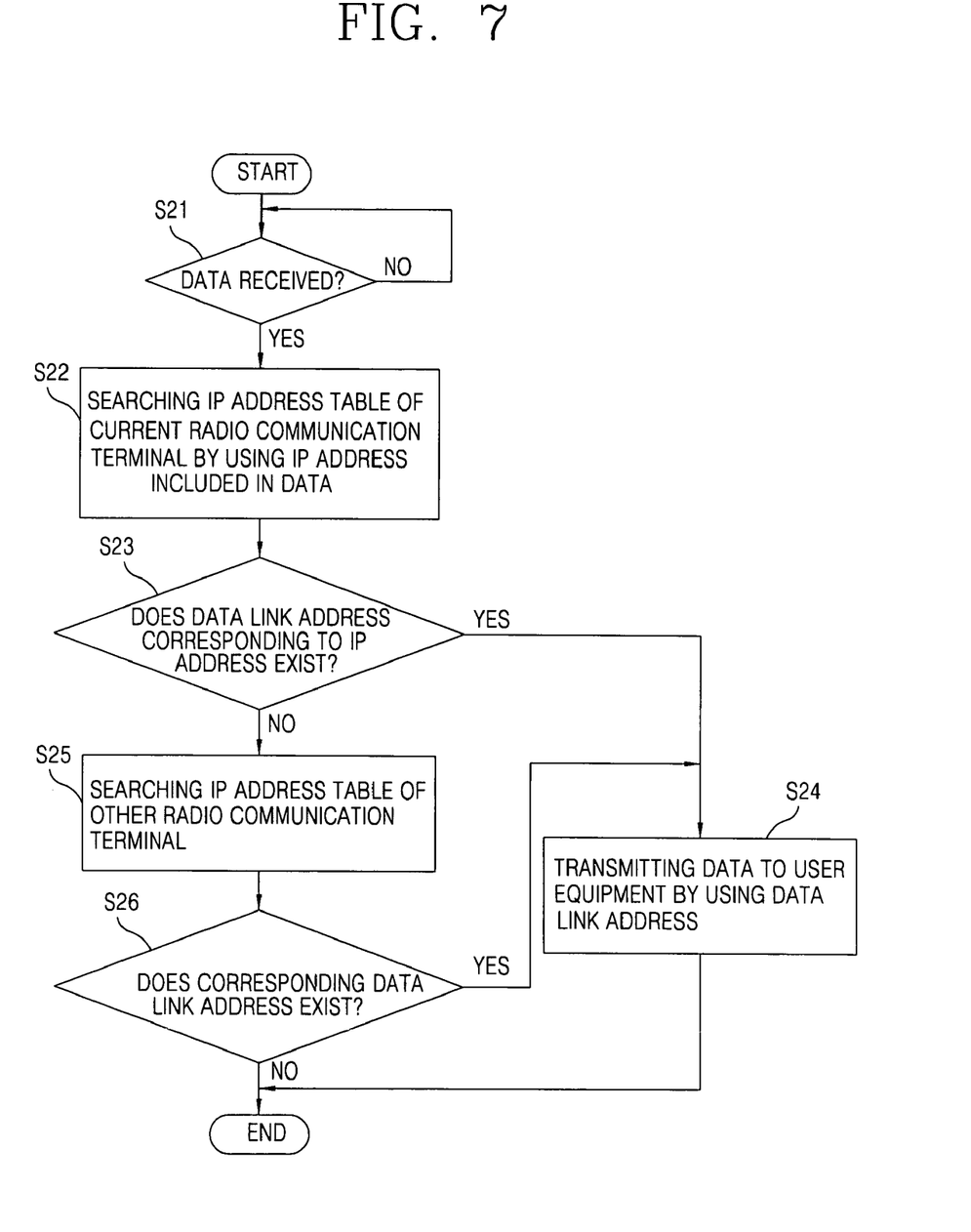
FIG. 7 is a flow chart showing an operation of the multi-access system upon receiving data from radio communication terminals.

FIG. 7 is a flow chart of an operation of the multi-access system upon receiving data from radio communication terminals. For example, when data is received from the radio communication terminal 300 (step S21), the multi-access routing system 220 of the multi-access system 200 checks whether an IP address contained in the received data is in the IP address table of the current radio communication terminal 300 by searching the IP address table, rather than searching every IP address table (step S22). The reason why the IP address of the current radio communication terminal 300 is first searched is because there is higher possibility that a data is received from the radio communication terminal which has transmitted a data than a possibility that a data is received from a different radio communication terminal 310.

If an IP address of the received data is in the IP address table of the current radio communication terminal 300, the multi-access routing system 220 obtains a data link address of the IP address searched from the IP address table 9 step S23) and transmits the received data to the user equipment corresponding to data link address (step S24). Since the user equipments 100-120 and the multi-access system 200 are connected by the ethernet or the bluetooth method, the multi-access system 200 can discriminate the user equipments 100-120 by using the data link address.

If, however, the IP address of the received data is not in the IP address table of the current radio communication terminal 300, the multi-access routing system 220 searches other IP address table (step S25).

Then, if the multi-access routing system 220 can obtain a data link address of a user equipment, a destination of the received data, by using the IP address of the received data (step S26), it transmits the received data to the corresponding user equipment (step S24).

Therefore, the multi-access routing system 220 may not transmit a message to obtain a data link address of the user equipment 100-120 to the user equipments 100-120.

In this manner, the multi-access system 200 transmits the data received from the plurality of radio communication terminals 300-310 to the corresponding user equipment by using the data link address. As so far described, the system and method for multi-accessing a radio communication data call of the present invention have many advantages. First, since a plurality of user equipments can multi-access the data call of the radio communication terminals, a high-speed wireless line can be effectively used.

Second, the plurality of user equipments accessed to one radio communication terminal can be provided with a service from a data service providing network, which has been suitably distributed by the radio communication data call multi-access system.

Third, the multi-access method of the radio communication data call can be changed by a user of a data service.

Fourth, a use state of a radio resource can be monitored according to a command of the user of a data service.

Fifth, a data service can provide by occupying the radio communication terminals as many as required according to a desired transfer rate.

Sixth, even when there are more user equipments than the radio communication terminals, a data call service can be provided by using less number of radio communication terminals.

Seventh, the radio communication terminal or the user equipment can be used as it is in the same manner as the case of using the existing LAN without a special setting or controlling.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A data transmission system, comprising:
   at least one personal computer; and
   a multi-access system including or coupled to a communication device, the multi-access system coupled to the personal computer through a Bluetooth connection;
   wherein data packets are transmitted between the personal computer and the communication device through the Bluetooth connection,
   wherein the data packets are sent from the communication device for transmission via an air interface to the Internet,
   wherein the multi-access system comprises:
      a system for receiving data packets from a plurality of computers;
      a packet-call connection system for interfacing with one or more radio communication terminals; and
      a multi-access routing system for routing data packets from a multimedia system to the radio communication terminals according to a slot assignment method, and
   wherein the slot assignment method comprises:
      performing a one-on-one assignment for mapping each of the computers to a respective one of the radio communication terminals; and
      a common sharing method for allowing each computer to share the plurality of radio communication terminals for transmitting data packets.

2. The system of claim 1, wherein a plurality of personal computers access at least one radio communication terminal through the multi-access system.

3. The system of claim 1, wherein the personal computer is a laptop computer.

4. The system of claim 1, further comprising:
   at least one radio communication terminal;
   wherein the multi-access system is located between the radio communication terminal and the personal computer.

5. The system of claim 4, wherein the data packets belonging to a same call are transmitted from the personal computer for wireless transmission through a plurality of radio communication terminals.

6. The system of claim 1, wherein data packets belonging to a same call are transmitted between the personal computer and a plurality of radio communication terminals based on a same destination IP address and a same data link address, said same data link address corresponding to the personal computer.

7. A data transmission system, comprising:
   at least one personal computer; and
   a multi-access system including or coupled to a communication device, the multi-access system coupled to the personal computer through a Bluetooth connection;
   wherein data packets are transmitted between the personal computer and the communication device through the Bluetooth connection,
   wherein the data packets are sent from the communication device for transmission via an air interface to the Internet, and
   wherein the multi-access system comprises:
      a system for receiving data packets from a plurality of computers;
      a packet-call connection system for interfacing with one or more radio communication terminals; and
      a multi-access routing system for routing data packets from a multimedia system to the radio communication terminals according to a slot assignment method, and
   wherein the receiving system comprises:
   a plurality of physical data link control circuits provided in one-to-one correspondence with the plurality of computers, each of said physical data link control circuits controlling a corresponding physical data link;
   a TCP/IP control circuit to perform a TCP/IP protocol function on data packets transmitted from the plurality of physical data link control circuits;
   a command/response control circuit for performing/responding to a command of the computers transmitted from the TCP/IP control circuit; and
   a data control circuit for sorting and buffering data transmitted from the TCP/IP control circuit.

8. The system of claim 7, wherein the slot assignment method is set by the plurality of computers.

9. A data transmission system, comprising:
   at least one personal computer; and
   a multi-access system including or coupled to a communication device, the multi-access system coupled to the personal computer through a Bluetooth connection;
   wherein data packets are transmitted between the personal computer and the communication device through the Bluetooth connection,
   wherein the data packets are sent from the communication device for transmission via an air interface to the Internet,
   wherein the multi-access system comprises:
      a system for receiving data packets from a plurality of computers;
      a packet-call connection system for interfacing with one or more radio communication terminals; and
      a multi-access routing system for routing data packets from a multimedia system to the radio communication terminals according to a slot assignment method, and
   wherein the multi-access routing system:
      sets a slot assignment method according to a command of at least one of the computers,
      assigns a slot to said one of the computers according to the set slot assignment method, and
      routes data packets associated with a same call between said one of the computers and multiple ones the radio communication terminals based on a same destination IP address and a same data link address associated with each of the packets.

* * * * *